(12) United States Patent
Bellamy et al.

(10) Patent No.: US 9,923,938 B2
(45) Date of Patent: Mar. 20, 2018

(54) MANAGING DROP-INS ON FOCAL POINTS OF ACTIVITIES

(71) Applicant: INTERNATIONAL BUSINESS MACHINES CORPORATION, Armonk, NY (US)

(72) Inventors: Rachel K. E. Bellamy, Bedford, NY (US); Jonathan H. Connell, II, Cortlandt-Manor, NY (US); Robert G. Farrell, Cornwall, NY (US); Brian P. Gaucher, Brookfield, CT (US); Jonathan Lenchner, North Salem, NY (US); David O. S. Melville, New York, NY (US); Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 113 days.

(21) Appl. No.: 14/797,817

(22) Filed: Jul. 13, 2015

(65) Prior Publication Data

US 2017/0017640 A1 Jan. 19, 2017

(51) Int. Cl.
*G01L 15/00* (2006.01)
*H04L 29/06* (2006.01)
*H04M 1/00* (2006.01)

(52) U.S. Cl.
CPC ............. *H04L 65/403* (2013.01); *H04M 1/00* (2013.01)

(58) Field of Classification Search
CPC ............... G06F 3/0481; G06F 3/04842; G06F 17/30864; G06F 3/01; G06F 3/041; G06F 3/044; G06F 3/048; G06F 3/0482; G06F 3/0488; G06F 3/14; G06F 3/167; G06F 3/0486; G06F 13/36; G06F 13/4068; G06F 3/00; G06F 17/24; G06F 17/30292; G06F 17/30315; G06F 17/30339; G06F 17/3089; G06F 17/5031; G06F 2217/84;
(Continued)

(56) References Cited

U.S. PATENT DOCUMENTS

| 5,999,208 A | 12/1999 | McNerney et al. |
| 7,653,627 B2 * | 1/2010 | Li .......................... G06Q 30/02 707/999.007 |

(Continued)

OTHER PUBLICATIONS

R. Pea et al., "The Diver Project: Interactive Digital Video Repurposing", IEEE MultiMedia, vol. 11, No. 1, pp. 54-61, Jan./Mar. 2004, doi:10.1109/MMUL.2004.1261108 (Abstract Only).

(Continued)

*Primary Examiner* — Abdelali Serrou
(74) *Attorney, Agent, or Firm* — Law Office of Jim Boice

(57) ABSTRACT

A computer-implemented method manages drop-ins on conversations near a focal point of proximal activity in a gathering place. One or more processors receive a first set of sensor data from one or more sensors in a gathering place, and then identify a focal point of proximal activity based on the first set of received sensor data received from the one or more sensors. One or more processors characterize a conversation near the focal point based on a second set of received sensor data from the one or more sensors, and then present a characterization of the conversation to an electronic device. One or more processors enable the electronic device to allow a user to drop-in on the conversation.

17 Claims, 7 Drawing Sheets

(58) Field of Classification Search
CPC ......... G10L 15/02; G10L 13/00; G10L 13/02;
G10L 13/027; G10L 15/00; G10L 15/22;
G10L 15/24; G10L 17/22; G10L
2015/088; G10L 2015/223; G10L
2015/226; H04L 12/1827; H04M
1/72563; H04M 1/72569; H04M 2250/74;
H04M 3/56; H04M 3/567

See application file for complete search history.

(56) References Cited

U.S. PATENT DOCUMENTS

| | | | | |
|---|---|---|---|---|
| 8,065,155 | B1* | 11/2011 | Gazdzinski | G06Q 30/0251 369/24.01 |
| 8,412,587 | B2 | 4/2013 | Rabenold et al. | |
| 8,896,657 | B2* | 11/2014 | Wang | H04N 7/142 348/14.07 |
| 9,648,058 | B2* | 5/2017 | Tseng | H04L 65/403 |
| 2006/0122929 | A1 | 6/2006 | Schoen et al. | |
| 2011/0145002 | A1* | 6/2011 | Melamed | G10L 25/48 704/278 |
| 2011/0285809 | A1* | 11/2011 | Feng | G06K 9/00234 348/14.16 |
| 2012/0323579 | A1* | 12/2012 | Gibbon | G10L 15/1822 704/270 |
| 2013/0176438 | A1* | 7/2013 | Mate | H04N 7/181 348/157 |
| 2014/0218461 | A1* | 8/2014 | DeLand | H04L 12/1813 348/14.07 |
| 2015/0049162 | A1* | 2/2015 | Kurupacheril | H04N 5/23238 348/14.08 |
| 2015/0051949 | A1* | 2/2015 | Pickton | G06Q 30/0202 705/7.31 |

OTHER PUBLICATIONS

R. S. Fish et al., "Evaluating Video as a Technology for Informal Communication", Proceedings of the SIGCHI Conference on Human Factors in Computing Systems, ACM, 1992, pp. 37-48 (Abstract Only).

R. Pea et al., "Diver: Overview of DIVER System (Panoramic Capture)", Stanford University, http://diver.stanford.edu/overview.html, retrieved Jul. 13, 2015, 1 page.

S. Griffiths "The Hearing Aid for Spies: Clip-on Amplifier Eavesdrops on Conversations and Even Translates Foreign Languages in Real Time", Daily Mail, DailyMail.com, Oct. 13, 2014, pp. 1-4.

P. Mell et al., "The NIST Definition of Cloud Computing", National Institute of Standards and Technology, Information Technology Laboratory, Sep. 2011, pp. 1-7.

* cited by examiner

MANAGING DROP-INS ON FOCAL POINTS OF ACTIVITIES

BACKGROUND

The present disclosure relates to the field of computers, and specifically to the field of computers that deliver cognitive services with the use of sensor data. Still more specifically, the present disclosure relates to the field of enabling an electronic device to allow a user to drop-in on a conversation in a gathering place.

SUMMARY

In one embodiment of the present invention, a computer-implemented method and/or computer program product manages drop-ins on conversations near a focal point of proximal activity in a gathering place. One or more processors receive a first set of sensor data from one or more sensors in a gathering place, and then identify a focal point of proximal activity based on the first set of received sensor data received from the one or more sensors. One or more processors characterize a conversation near the focal point based on a second set of received sensor data from the one or more sensors, and then present a characterization of the conversation to an electronic device. One or more processors enable the electronic device to allow a user to drop-in on the conversation.

In one embodiment of the present invention, a system manages drop-ins on conversations near a focal point of proximal activity in a gathering place. The system comprises one or more sensors in a gathering place and a connection to an electronic device. The one or more sensors in the gathering place generate a first set of sensor data and a second set of sensor data. The first set of sensor data identifies a focal point of proximal activity in the gathering place, and the second set of sensor data characterizes a conversation near the focal point. The connection to the electronic device transmits a characterization of the conversation to the electronic device, thus enabling the electronic device to allow a user to drop-in on the conversation.

DETAILED DESCRIPTION

Figure 1:
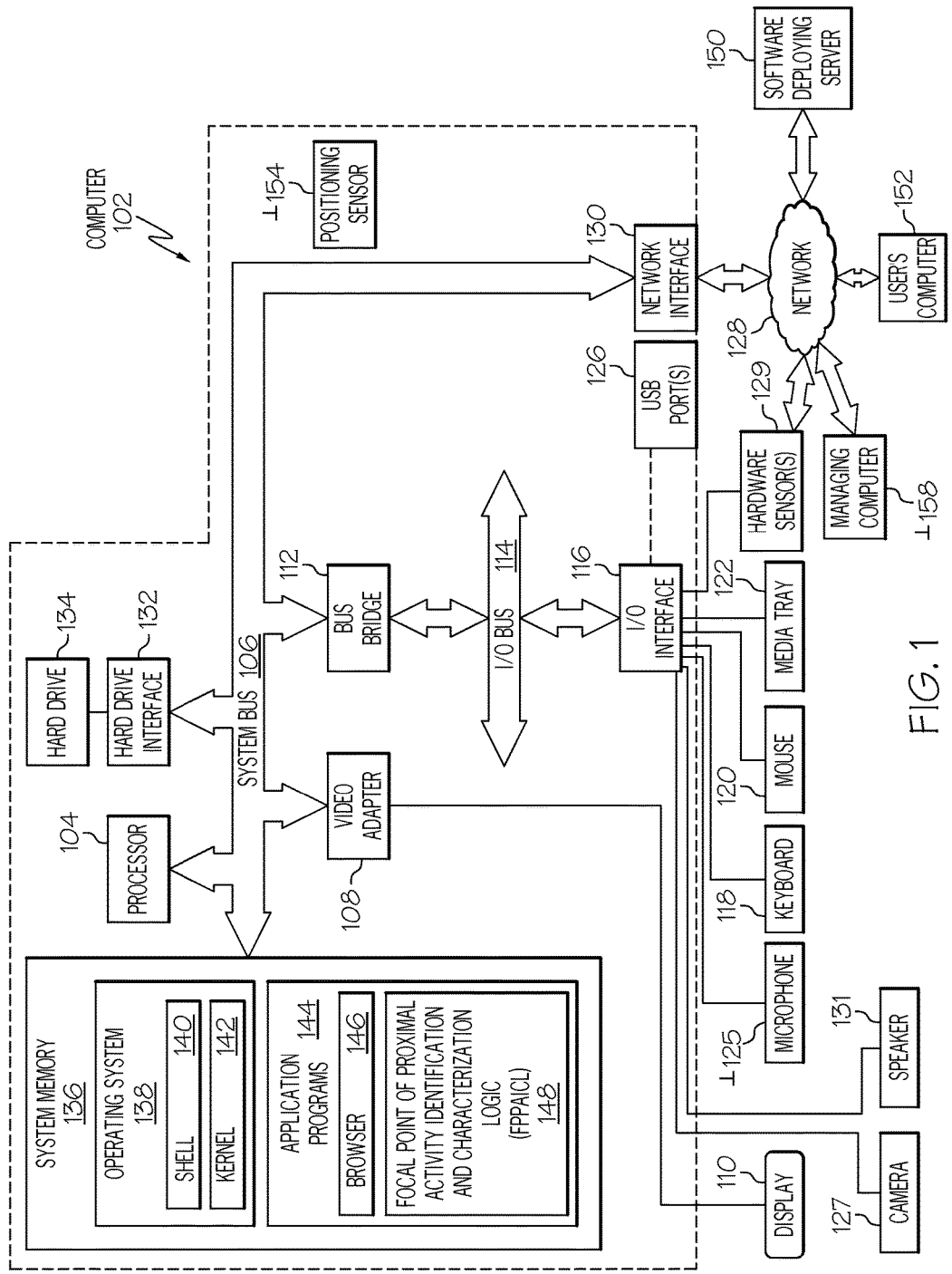
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 102 may be utilized by software deploying server 150, user's computer 152, and/or managing computer 158.

Exemplary management computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), and/or external USB port(s) 124. While the format of the ports connected to I/O interface 116 may be any known to those skilled in the art of computer architecture, in one embodiment some or all of these ports are universal serial bus (USB) ports.

Also coupled to I/O interface 116 is a microphone 125, which is capable of capturing audio sounds and/or converting them into digital signals/files.

Also coupled to I/O interface 116 is a camera 127, which is capable of capturing photo images as still photographs and/or moving video images, and/or converting them into digital signals/files.

Also coupled to I/O interface 116 are hardware sensor(s) 129, which may be a motion detector, a biometric sensor and/or a chemical sensor.

When implemented as a motion detector, one or more of the hardware sensor(s) 129 are capable of detecting movement direction and/or velocity and/or acceleration of an entity. Such a motion detector may use any type of technology known in the field of motion detection, including but not limited to passive infrared (PIR) sensors that detect movement of body heat, microwave sensors that detect a shift in frequency (i.e., a Doppler shift) in transmitted/received electromagnetic signals based on the movement of the target entity, ultrasonic sensors that detect Doppler shifts at low frequencies of sound, and video camera software that takes moving/sequential images from camera 127 and calculates optical flow fields. Motion may also be detected indirectly by tracking a discrete entity across two or more sequential snapshots. The basic entity may be found in a snapshot using radar, sonar, visual background subtraction, visual template matching, visual motion differencing, or by using the position of a carried device. The momentary position of a carried device may be based on a signal transmitter located on the device, or based on the reception by the device of signal from one or more external transmitters. Such transmitters may, without limitation, be based on light, radio waves, compressive sound waves, surface sound waves, or magnetic fields.

When implemented as a biometric sensor, one or more of the hardware sensor(s) 129 collects biometric data about a user. The term "biometrics" covers two usages: (1) measuring broad properties of a biological process or structure; and (2) identifying an individual by the presence of his unique fine-grained biological structure. Coarse biometric data is data describing a physiological state, physical attribute, or measurement of a physiological condition. It may include without limitation, heart rate, pupil dilation, blood pressure, respiratory rate, body temperature, blood sugar levels, and any other physiological data. Fine-grained biometric data is data useful for discriminating between individuals irrespective of their physiological state. This may include, without limitation, facial images, 3D face shape, fingerprints, thumbprints, palm prints, footprints, retinal patterns, iris patterns, EKG traces, gait sequences, voiceprints, interior heart shape, pattern of brain convolutions, and any other such structural data. Hardware sensors acting as biometric sensors may include, without limitation, fingerprint scanners, palm scanners, thumb print scanners, retinal scanners, iris scanners, video cameras, and microphones for capturing voice sounds. Biometric sensors may also include, without limitation, wireless blood pressure monitor, heart monitor, thermometer or other body temperature measurement device, blood sugar monitor, microphone capable of detecting heart beats and/or breath sounds, a breathalyzer, or any other type of biometric device.

When implemented as a chemical sensor, one or more of the hardware sensor(s) 129 detects airborne chemicals and/or airborne odor causing elements, molecules, gases, compounds, and/or combinations of molecules, elements, gases, and/or compounds in an air sample, such as, without limitation, an airborne chemical sensor, a gas detector, and/or an electronic nose. In one embodiment, such a set of chemical sensors is implemented as an array of electronic olfactory sensors and a pattern recognition system that detects and recognizes odors and identifies olfactory patterns associated with different odor causing particles. The array of electronic olfactory sensors may include, without limitation, metal oxide semiconductors (MOS), conducting polymers (CP), quartz crystal microbalance, surface acoustic wave (SAW), and field effect transistors (MOSFET). The particles detected by a set of chemical sensors may include, without limitation, atoms, molecules, elements, gases, compounds, or any type of airborne odor causing matter.

Also coupled to I/O interface 116 are a plurality of speakers 131, which are able to electronically generate sound from electronic audio files/signals.

Also associated with computer 102 is a positioning sensor 154, which may be implemented as a global positioning system (GPS), which is a positioning system that receives signals from space-based positioning satellites to identify (through signal triangulation) a location of a GPS-enabled device, such as computer 102, user's computer 152, etc. In an indoor environment or other environment in which GPS signals are not normally receivable, the positioning sensor 154 may use signals from local/interior transmitters. These can be triangulated based on inferred path length (e.g. phase shift or signal strength) and/or relative beacon angle to position the computer 102 in two-dimensions and/or three-dimensions. Alternatively, a collection of beacon characteristics may be collected and compared to a number of pre-stored signatures for various environmental locations. The closest match of signatures thereby gives the presumed location. Still another possibility is for the device to emit some sort of signal (or signals) that is picked up by sensors with fixed environmental positions. From the characteristics of the received signals, in conjunction with the receiver location(s), the real-world position of the device in 2D or 3D can be computed.

As depicted, computer 102 is able to communicate with a software deploying server 150 and/or user's computer 152 and/or managing computer 158 using a network interface 130. Network interface 130 is a hardware network interface, such as a network interface card (NIC), etc. Network 128 may be an external network such as the Internet, or an internal network such as an Ethernet or a virtual private network (VPN) or a local area network (LAN). Various physical layers may be used to establish the connection. These include, but are not limited to, wired Ethernet, fiber-based Ethernet, coaxial Ethernet, Bluetooth, Bluetooth low energy, NFC, wired serial port, infrared, capacitive coupling, inductive coupling, laser, and acoustic connections. The host-to-device link does not necessarily have to use the same physical layer as the device-to-host link, and either type of link may change physical layer and/or transmission protocol over time.

A hard drive interface 132 is also coupled to system bus 106. Hard drive interface 132 interfaces with a hard drive 134. A hard drive may be a rotating magnetic storage device, a rotating optical storage device, a solid-state Flash disk, magnetic bubble memory, magnetic tape, perforated paper tape, perforated cards, optical code, hologram, or any other storage device that maintains its state in the absence of power. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a Focal Point of Proximal Activity Identification and Characterization Logic (FPPAICL) 148. FPPAICL 148 includes code for implementing the processes described below, including those described in FIGS. 2-4. In one embodiment, computer 102 is able to download FPPAICL 148 from software deploying server 150, including in an on-demand basis, wherein the code in FPPAICL 148 is not downloaded until needed for execution. In one embodiment of the present invention, software deploying server 150 performs all of the functions associated with the present invention (including execution of FPPAICL 148), thus freeing computer 102 from having to use its own internal computing resources to execute FPPAICL 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention. While logic (e.g., FPPAICL 148 shown in FIG. 1) used to facilitate drop-ins as described herein may be located in a single processing entity (e.g., computer 102, user's computer 152, managing computer 158, etc.), in one or more embodiments of the present invention such logic is widely distributed. That is, such logic can be distributed across a "cloud" of computing resources, or it may be distributed across one or more of the computing systems depicted in FIG. 1, or it may be distributed across an "Internet of things". For example, logic to control movement of cameras, microphones, generating GUI displays, etc. as described herein may be distributed across logic within the microphone 125, camera 127, etc. shown in FIG. 1.

Figure 2:
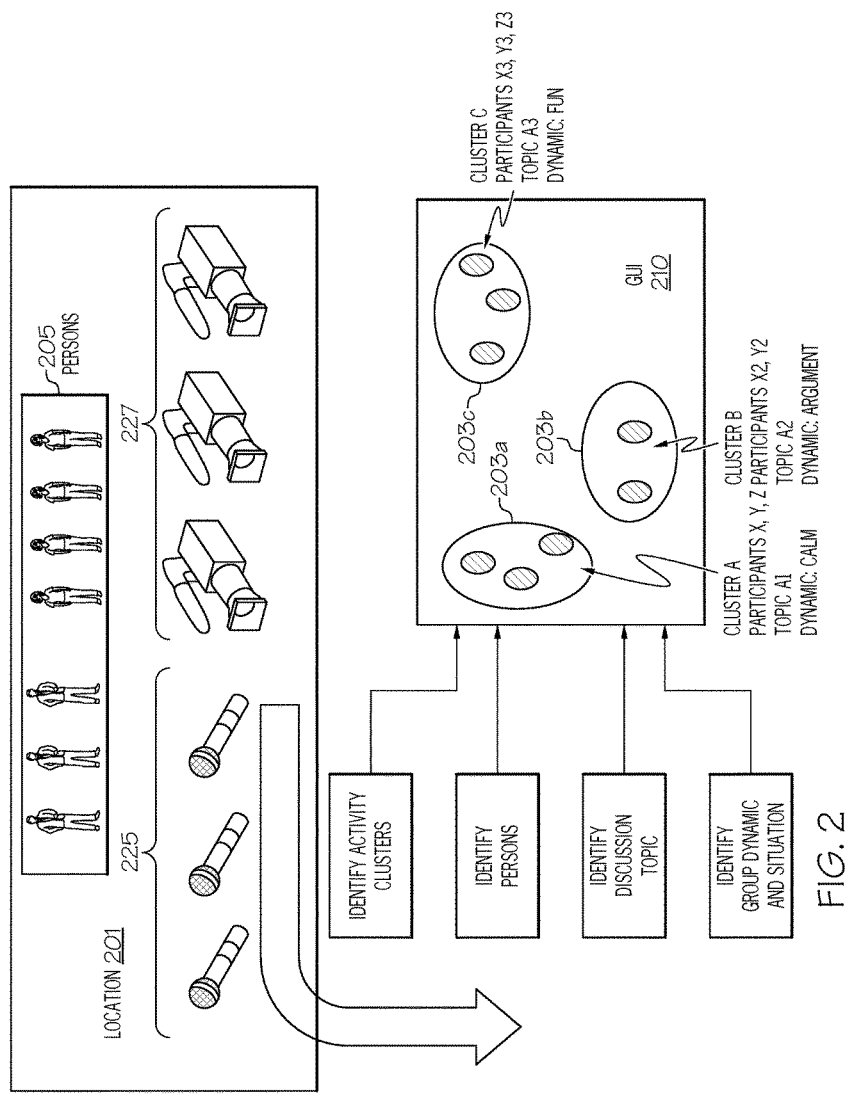
FIG. 2 illustrates an exemplary location in which clusters of persons are defined and detected in accordance with one or more embodiments of the present invention.

With reference now to FIG. 2, an exemplary location 201 in which clusters of persons are identified and characterized in accordance with one more embodiments of the present invention is presented. Location 201 is a gathering place (e.g., a place where a group can stand and talk) at a physical location (e.g., a room, lab, classroom, auditorium). People may be transitioning in and out of the physical location over time, but the purpose of the location is as a gathering place.

Assume that within location 201 are multiple persons 205. Assume further that these multiple persons 205 are interacting with one another within various clusters. For example, location 201 may be a convention center, in which multiple presentations are being made for the same or different products. In another example, location 201 may be a classroom of students, who are working together on the same or different projects such as laboratory experiments. In both examples, persons 205 within the location 201 are in clusters of persons, such as clusters 203*a*-203*c*.

The present invention provides a technical solution to 1) identify, 2) characterize, and 3) enable participation with one or more clusters of persons.

As shown in FIG. 2, assume that an array of microphones 225 (analogous to microphone 125 in FIG. 1) and an array of cameras 227 (analogous to camera 127 in FIG. 1) are capturing sounds (including conversations) and images of persons 205 within location 201. Sensor data from microphones 225 and/or cameras 227 are then used to spatially locate clusters of persons and persons within each cluster, and to characterize any conversations captured by cameras and microphones focused on persons in the cluster by identifying the people, discussion topic and/or the group dynamic of each of the clusters 203*a*-203*c*.

For example, assume that clusters 203*a*-203*c*, depicted on a graphical user interface (GUI) 210 (analogous to display 110 in FIG. 1) on a user's computer 152, shows the presence of three clusters of persons (from the persons 205 within location 201). In one or more embodiments of the present invention, the clusters 203*a*-203*c* are initially defined simply by the fact that persons within the clusters 203*a*-203*c* are in close proximity to one another, thereby defining each of the clusters 203*a*-203*c*. In addition, during a conversation people are usually facing each other or looking at each other. This information may also be used when forming clusters based on detected body positions. Similarly, gestural information, such as pointing toward other members of a group, may be used to aid clustering. In other preferred embodiments of the present invention however, clusters 203*a*-203*c* are further defined according to common features of the conversations within the clusters 203*a*-203*c* (e.g., shared topics of discussion). People can be located as objects in 3D using depth-based sensing, visual face finding and apparent size, head finding, motion regions (fidgeting), or by detecting sources of acoustic energy based on multiple microphones. In the preferred embodiment, people's heads are identified from ceiling-mounted cameras and the centroid of the head is projected onto the 2-D floor plane for clustering. Clustering methods are then used to determine groups of people. Affinity propagation, k-means, connectivity-based, similarity-based, hierarchical, agglomerative, and other clustering methods are example methods. The clustering method may use a heuristic maximum distance between points. In other words, given a heuristic maximum distance, there should be a spanning tree among the members of the cluster with maximum edge length no greater than the heuristic maximum distance. Cultural norms for social distance vary, but generally there is a typical maximum distance of this sort for people conversing (e.g., 1 meter) and it is unlikely if people are conversing more than 4 meters apart.

In one embodiment of the present invention, the audio streams and visual streams from microphones 225 and/or cameras 227 are used to determine the identity of the persons within each of the clusters 203*a*-203*c*. For example, facial recognition logic may process such data streams to identify the persons 205 within the location 201 and/or the persons within clusters 203*a*-203*c*. Similarly, text analysis of sequences of words recognized by a speech recognition module captured by the microphones 225 (e.g., "Hello, Person A, my name is Person B" being captured by the microphones 225) may identify the persons within each of the clusters 203*a*-203*c*. People can also be identified by acoustic speaker identification, visual face recognition, reading of visual labels such as name tags, proximity to ancillary devices with known ownership (e.g. WiFi localization of laptops), direct verbal introduction ("Hi, system, I'm Dave"), gait, gaze, fingerprint, retina scan, as well as other biometric and non-biometric methods.

Clusters may also include remote participants that have already opted to "drop in" on particular physical group as will be discussed relative to FIG. 3. In such cases, the identities and speech of the remote participants can also be used during the formation and characterization of each cluster.

The topic being discussed within each cluster and/or each subgroup within each cluster may also be derived from speech captured by the microphones 225. For example, key words or phrases (e.g., "Product A", "Topic X", "Issue Z") captured by the microphones 225 can be used to identify the topic of discussion being held by members of each of the clusters 203*a*-203*c*, thereby enabling a characterization of each of the clusters 203*a*-203*c*, if not actually being used to define the clusters 203*a*-203*c* themselves. If appropriate key words are not available or are not recognized in the speech captured by the microphones, all the words captured with the microphones ("terms") can be analyzed and used to determine the topic of discussion by determining term frequencies (e.g., "yesterday"=1, "hate"=2, "watch"=4, "product"=6, "the"=7). Terms that are very frequent in a general corpus of conversations (e.g., "the") are then removed. Frequent terms unique to the cluster are listed first and then other terms. For example, if "product" is frequent in all clusters, but "watch" is frequent in only this cluster, then the words used to characterize the topic of discussion might be watch (4), hate (2), yesterday (1). Additional probabilistic and statistical methods may be used to assess term relevance. In particular, latent semantic indexing (LSI) may be used to infer a general conversational topic for each cluster of participants based on the distribution of various words heard.

The captured sequences of words may be enough to characterize the clusters 203a-203c, as just described, or a contextually disambiguated collection of word senses may be used to characterize the clusters 203a-203c. For example, if the microphones 225 capture parties to cluster 203a using the word "ram", then a contextual analysis may be used to characterize the cluster 203a as being persons interested in ranching (where a "ram" is a male sheep) or computers (where "ram" is an acronym for random access memory). If the cluster 203a is of persons at an agriculture conference, then that context (i.e., environment) infers that the definition of "ram" is a male sheep. If the cluster 203a is of persons at a computer conference, then that context infers that the definition of "ram" is random access memory. Thus, both the definition of "ram", as well as the context in which the word "ram" is used, will be used by the present system to characterize the cluster 203a.

The group dynamic of each cluster and/or each subgroup within each cluster can also be derived from sounds/images captured by the microphones 225 and/or cameras 227 to further characterize each cluster. For example, if the tone of speech captured by the microphones 225 is loud and boisterous, which may be confirmed by images captured by cameras 227 (e.g., wild gesticulation by persons within a particular cluster), then an assumption is made that the group dynamic is highly kinetic. However, if the captured speech/images show persons within a cluster to be calm and quiet, then the group dynamic is that of a low intensity.

Biometric sensors, such as the biometric sensors described in FIG. 1 with reference to hardware sensors 129, may be used to further characterize group dynamics of clusters. For example, if biometric sensors detect flushed skin, rapid breathing, dilated pupils, etc. on one or more members of a cluster, then an assumption is made that the group dynamic is of high intensity.

Similarly, readings produced by chemical sensors may be used to further characterize a cluster. For example, assume that a strong aroma of a certain food (e.g., barbeque) is detected by chemical sensors (see discussion of hardware sensor(s) 129 in FIG. 1 above) in a certain part of the location 201. An assumption can be made that the members of this cluster are barbeque cooks, whose clothing carries the telltale aroma of barbeque pits, and thus may be assigned to a same cluster. The chemical sensors do not merely characterize the "aroma" as being related to barbeque, however. Rather, the chemical sensors detect and quantify/qualify each chemical component in the air. That is, the chemical sensors 1) detect specific chemicals (e.g., certain organic compounds) in the area of a certain location/cluster, and then 2) quantify (possibly with exacting specificity beyond that possible by a human olfactory sense) the levels of such chemicals. Processing logic is then able to evaluate these chemical levels to further characterize the cluster. For example, if the chemical sensors detect high levels of a particular production chemical (e.g., a product such as glycol) emanating from clothing worn by members of the cluster, then the processing logic can infer that members of this cluster are workers from a petrochemical environment that produces glycol.

Thus, by using sensor readings, microphone outputs, captured video images, etc. of various clusters as just described, a characterization of each of the clusters 203a-203c can be derived. For example, cluster 203a can now be characterized as being made up of Participants (Persons) X, Y, Z, who are engaged in a discussion about Topic A1, in a manner that is calm. However, cluster 203b is now characterized as being made up of Participants X2 and Y2, who are discussing Topic A2 in an argumentative manner. Meanwhile, cluster 203c is made up of Participants X3, Y3, and Z3, who are discussing Topic A3 in a light-hearted fun discussion.

Figure 3:
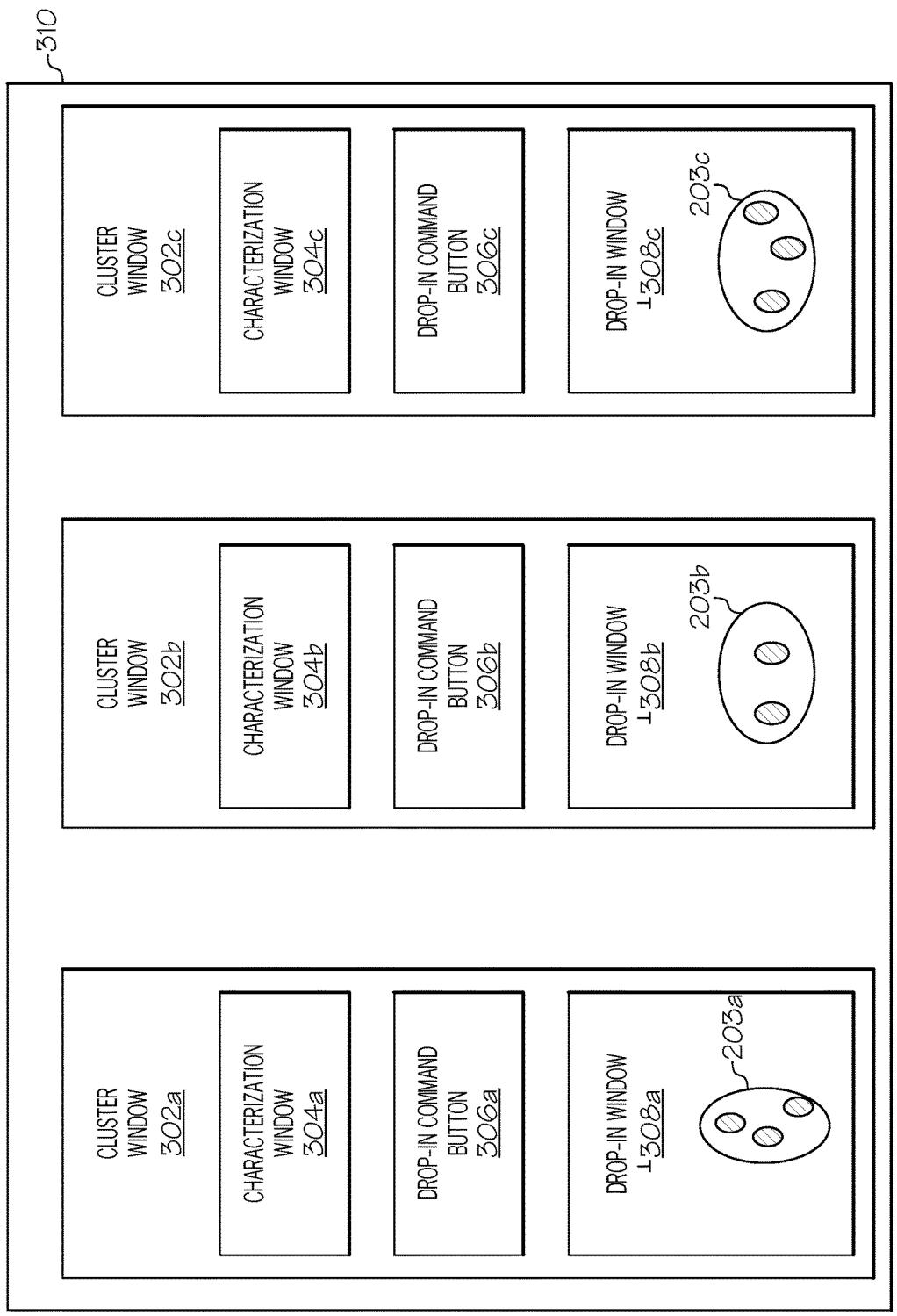
FIG. 3 depicts an exemplary graphical user interface (GUI) on a remote computer for dropping-in on a particular conversation near a focal point of proximal activity in a gathering place.

With reference now to FIG. 3, an exemplary graphical user interface (GUI) on a user's computer for dropping-in on a particular conversation near a focal point of proximal activity in a gathering place is presented.

As shown in FIG. 3, GUI 310 (being displayed on a display such as display 110 in the user's computer 152 shown in FIG. 1) contains three cluster windows 302a-302c, each of which relates to one of the clusters 203a-203c described in FIG. 2.

Using sensor data (e.g., speech captured by microphones, images captured by cameras, biometrics captured by biometric sensors, etc.) about parties in a particular cluster, the present system can generate a characterization about each of the clusters 203a-203c, as just described. This characterization is then displayed within one of the characterization windows 304a-304c shown in GUI 310. For example, using the example discussed in FIG. 2, characterization window 304a would display information stating that cluster 203a is made up of Persons X, Y, and Z, who are engaged in a discussion about Topic A1, in a manner that is calm.

If a user of the GUI 310 wants to drop-in on cluster 203a, then he/she will click the drop-in command button 306a. Clicking the drop-in command button 306a then causes a communication link to open between the physical location at which the cluster 203a is located and the user's computer, which may be at a remote location away from the physical location of cluster 203a. The term "drop-in" is defined as listening to a conversation being held by a cluster such as cluster 203a, watching a video feed of a cluster such as cluster 203a, and otherwise interacting with a cluster such as cluster 203a. This may include transmitting audio, video, image, and/or text data to the selected cluster in such a manner that the physical participants in the cluster are able to perceive it.

For example, in one embodiment of the present invention a remote user (e.g., a user of the GUI 310 shown in FIG. 3) drops-in on a cluster via a video teleconference between a remote user and the cluster. That is, members of the cluster (e.g., cluster 203a) and the remote user (e.g., the user of GUI 310) share a view of a drop-in window 308a containing images of the cluster 203a and/or the remote user (not shown), such that members of cluster 203a see the remote user and/or the remote user sees the members of the cluster 203a.

In one embodiment of the present invention, the remote user drops-in on the cluster (e.g., cluster 203a) via an audio teleconference between the remote user and the cluster, such that members of the cluster 203a hear the remote user and/or the remote user hears the members of the cluster 203a.

In one embodiment of the present invention, the remote user drops-in on the cluster (e.g., cluster 203a) via a remotely controlled physical robot at the location of the cluster. That is, the drop-in window 308a provides a communication link to a robot (not shown) that is physically positioned proximate to cluster 203a. This communication link affords a pathway for commands from the remote user to control the robot, which interacts with members of the cluster 203a by directing cameras, microphones, speakers mounted on the robot to particular members of the cluster 203a, all under the control of the remote user. Additionally, in one embodiment of the present invention the remote user controls the robot's position in the cluster, the content of any screens mounted on the robot, and the configuration of any manipulator on the robot (e.g. to point at a particular person, object, or graphic). An interface to such controls can be part of the GUI 310.

In one embodiment of the present invention, interactions between members of the cluster (e.g., cluster 203a) and the remote user are via avatars (or chatbots). For example, assume that drop-in window 308a shows avatars of members of the cluster 203a and/or an avatar for the remote user. These avatars can be physically moved according to the positioning sensors described above (e.g., positioning sensor 154 in FIG. 1). Furthermore, the characterizations described above (using text analysis, speech analysis, biometric analysis, etc.) to characterize an entire cluster can also be used to adjust the appearance of each of the avatars for members of the cluster as well as the remote user. In one embodiment, these computer-generated avatars can be overlaid onto real-time images (captured by the array cameras 227 shown in FIG. 2) of members of the cluster or the remote user.

Users of GUI 310 can provide user input to label groups. For example, individual people can be manually labeled, if the automatic labels are not sufficient. Similarity, the topic of conversation and group dynamic may be manually labeled. Both manual and automatic labels may be displayed. A list may be supplied for manual labeling (e.g., calm) to standardize the terminology. Label corrections can be used as input to machine learning algorithms.

In FIG. 3, all of the drop-in windows 308a-308c are shown as being displayed on GUI 310. This allows the remote user to continue to track and monitor other clusters. That is, if the remote user of the GUI 310 has dropped-in on cluster 203a as described above, he/she can still monitor clusters 203b-203c. If one of the characterization windows 304b-304c presents characterization information that is of interest to the remote user (e.g., a conversation changes in content and/or tone that is more interesting than that of cluster 203a), then clicking one of the drop-in command buttons 306b-306c will cause the remote user to drop-in on one of the clusters via one of the drop-in windows 308b-308c. In one embodiment of the present invention, the remote user is able to drop-in to (participate in) multiple clusters, while in another embodiment, leaving a first cluster (from clusters 203a-203c) to drop-in on another cluster terminates the drop-in session with the first cluster.

When a remote user drops in to a cluster, the audio/video feeds from other clusters can be suppressed (noise-cancelled away, reduced in volume, and/or filtered, blocked) bringing the conversation within the cluster to the fore. The remote user's audio is routed to the speakers near the people in the cluster so that the remote user can participate with potentially less impact on other conversations, particularly if people in the cluster are wearing headphones.

The audio/video streams for the conversation being dropped in on can be boosted in various ways to improve both the ability of the person dropping in and the people locally. It should be noted that the users using the GUI are not necessarily remote. Users who have dropped in to the conversation appear on the GUI, but in a manner visually distinct from the people detected in the room. The location of a person who has dropped in can be determined in various ways (e.g., location of robot if dropping in by robot, location of display of video monitor if dropping in by videoconference, centroid of the speakers used for their speech output to the conversation if dropping in by audio.). If people are in the room when dropping in, then the GUI may be displayed for all users to see. In a room with enough microphones and video cameras, people, whether in the room or remote, can have personal audio and personal microphones and use the GUI to drop-in on conversations throughout the room. If selection of multiple clusters is enabled on the GUI, audio from the multiple clusters selected is mixed. Thus, no matter where a person is located, they can drop-in on one or more conversations in the room.

Drop-ins do not have to be mediated visually using the GUI. A speech interface or other inputs and outputs may be used to convey the identity of the people and the clusters, the labels, the topics of conversation, and the group dynamics. In fact, the GUI can be configured in various ways so that discussion topic or group dynamics may not be displayed at all. The key requirements are only that the groups of people and the drop-in ability are present, and when the drop-in happens the person is able to participate in the conversation. Beyond this, any other sort of audio and visual processing may be used to further characterize the groups in addition to the basic clusters.

Note that the clusters 203a-203c shown in FIG. 2 may be dynamic. That is, persons (either physically present or remote drop-ins) joining in the conversation may come and go. Whenever a person joins or leaves a cluster, one embodiment of the present invention causes a notice to be generated, thus letting both members and non-members (potential drop-ins) of the cluster know who is participating in the conversation.

While the present invention is described herein as using certain parameters/features of clusters to characterize groups for presentation to a drop-in participant, in one or more embodiments the present invention uses heuristic processing to suggest participation with one or more of the clusters 203a-203c to a particular user. For example, assume that a certain user routinely (e.g., more than a predetermined percentage) chooses to drop-in on a cluster 203a, which has certain parameters (e.g., topic being discussed, profiles of members of the cluster, etc.) over other clusters 203b-230c. In this example, the system learns of this user's profile/preferences, and will suggest that this user participate in future clusters that have the same parameters/traits as cluster 203a.

Figure 4:
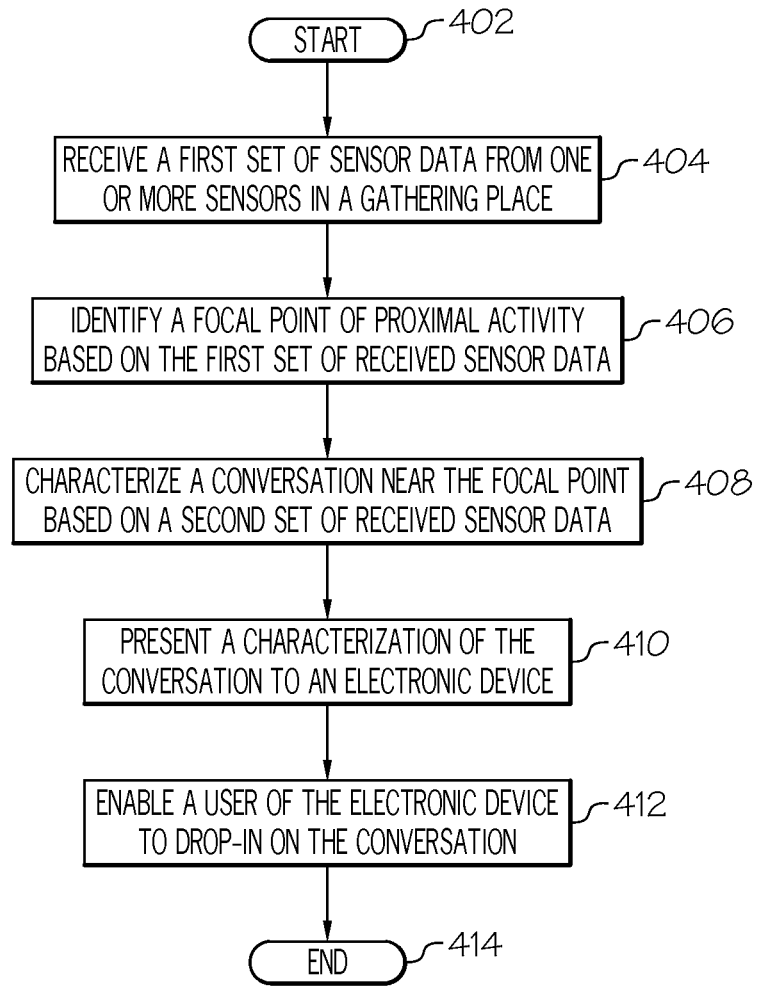
FIG. 4 is a high-level flowchart of one or more steps performed by one or more processors to manage drop-ins on conversations near a focal point of proximal activity in a gathering place.

With reference now to FIG. 4, a high-level flowchart of one or more steps performed by one or more processors to manage drop-ins on conversations near a focal point of proximal activity in a gathering place is presented.

After initialization block 402, one or more processors receive a first set of sensor data from one or more sensors in a gathering place (block 404). For example, a processor (e.g., processor 104 shown in FIG. 1) within a user's computer (e.g., user's computer 152 shown in FIG. 1) or a managing computer (e.g., managing computer 158 shown in FIG. 1) receives sensor data from one or more sensors (e.g., hardware sensor(s) 129 shown in FIG. 1) associated with a computer (e.g., computer 102 shown in FIG. 1) at a gathering place (e.g., location 201 shown in FIG. 2). That is, sensors (including microphones, cameras, biometric sensors, etc.) within a gathering place (e.g., a room) generate sensor data (e.g., speech, videos, biometric readings, etc.) about persons within the room. Such sensors may be moveable, steerable, fixed, affixed to persons, components of personal items such as smart phones or watches, etc.

As just indicated, the hardware and software logic for processing the sensor data may be within a user's personal electronic device (e.g., a tablet computer, a smart phone, etc.), or it may be from a managing computer that provides an interface between sensors in the room and the user's personal electronic device.

As described in block 406 in FIG. 4, one or more processors identify a focal point of proximal activity based on the first set of received sensor data received from the one or more sensors. The focal point is a location in three dimensions of persons in the room. For example, the clusters 203a-203c described in FIG. 2 each occupy specific focal points within the room. The location of the focal point of proximal activity can be determined using various systems and techniques. For example, in one embodiment the location of the focal point of proximal activity (i.e., a particular cluster of persons) is based on video generated by cameras in the room.

The proximal activity is that of persons who are in close proximity to one another. Examples of proximal activity include, but are not limited to, speaking to one another (verbal conversation), making physical gestures (e.g., hand waving, body movement, communicating using sign language, etc.), moving toward, away, or with one another, etc.

As described in block 408 in FIG. 4, one or more processors characterize a conversation near the focal point based on a second set of received sensor data from the one or more sensors. This conversation, which is between two or more members of an identified focal point of proximal activity (e.g., within a cluster), is characterized by different factors according to various embodiments of the present invention.

For example, in one embodiment of the present invention, the character of the conversation is based on the topic of the conversation. This topic is identified by taking captured speech from members of the cluster group that occupies a specific focal point within the room. The captured speech is converted into a text stream, which is analyzed for key words, contextual meaning, etc.

In one embodiment of the present invention, the character of the conversation is based on physical movement (activities) of members of the cluster group. For example, if one or more members are moving in a highly agitated manner, then the cluster is characterized as being energetic, passionate, or even frenetic.

In one embodiment of the present invention, the character of the conversation is based on which persons are members of the cluster having the conversation. This characterization may be based on identities, titles, roles, relationships to a user who may be interested in dropping-in on the conversation, etc.

In one embodiment of the present invention, the character of the conversation is based on one or more of the timbre, pitch and intensity of the conversation. For example, if the persons in the cluster are speaking softly, the conversation is characterized as being calm. However, if the persons in the cluster are shouting, then the conversation is characterized as being more energetic.

As described in block 410 of FIG. 4, a characterization of the conversation is then presented to an electronic device (e.g., a user's computer or other electronic device that supports a user interface such as the GUI 310 shown in FIG. 3) by one or more processors.

As described in block 412 of FIG. 4, one or more processors enable the electronic device to allow a user to drop-in on the conversation (e.g., by clicking one of the drop-in command buttons 306a-306c shown in FIG. 3).

The drop-in may be in the form of a dropping-in person/ user listening in on the conversation of the cluster of persons, verbally engaging in the cluster's conversation (using teleconferencing equipment such as the microphone 125 and speakers 131 shown in FIG. 1), visually engaging with the cluster having the conversation (using the camera 127 shown in FIG. 1 at the location of the cluster and another camera 127 at the location of the dropping-in person/user), controlling a robot or avatar to interact with the cluster, etc.

The flow-chart in FIG. 4 ends at terminator block 414. Typically, the flowchart presented specifies one iteration of a process that is run in a loop. That is, the whole process (steps 402-414) is repeated either continuously, at regular intervals, or at times based on detected significant events.

Note that multiple conversations may be ongoing within an area of a single cluster. In one or more embodiments of the present invention, these multiple conversations are mere "crosstalk" about a common topic, etc., and thus do not need to be teased out. However, in other embodiments, these different conversations within a single cluster are unique unto themselves (e.g., are about different sub-topics, have different characteristics, etc.), and thus are sub-conversations being held by sub-clusters of persons.

In accordance with one or more embodiments of the present invention, the different sub-conversations are extracted from ("teased out of") the main conversation using area-specific speech analysis. For example, consider again location 201 shown in FIG. 2, which has multiple microphones 225. In one embodiment, each of the microphones 225 are attached to a particular person from persons 205 (e.g., as a lapel microphone). By identifying which microphones are attached to particular persons, then a determination is made as to 1) which particular persons are engaged in the sub-conversation, and 2) the sub-topic of the sub-conversation.

In another embodiment, however, the microphones 225 shown in FIG. 2 are fixed area microphones. In this embodiment, beamforming signal processing or other differentiation processing is used to identify the sub-clusters of persons. Beamforming combines signals from the multiple microphones 225 as a phased array, such that angular interference identifies the location of particular persons whose speech is being picked up by the arrayed microphones 225.

In one embodiment of the present invention, extraneous speech by members of a particular cluster is filtered out. For example, a member of a particular cluster may be talking on a cell phone, talking to persons outside of the cluster, speaking to themselves, etc. One embodiment identifies such persons visually, by detecting that they are looking away from other persons within the cluster while speaking (on the phone, to another person across the room, etc.). Once identified, these extraneous conversations are eliminated from any analysis described herein.

Thus, in one or more embodiments of the present invention, sensors in a gathering place provide sensor data that allows processing logic to 1) identify clusters of persons; 2) characterize the conversations being held by the clusters of persons; and 3) electronically connect a user device to electronic devices proximate to the clusters of persons, thus allowing a user to drop-in electronically on one or more of the conversations.

In one embodiment of the present invention a sensor from one or more sensors is a microphone (e.g., microphone 125 shown in FIG. 1, which is associated with computer 102), which is located near a particular cluster (focal point of proximal activity). In this embodiment, the second set of received sensor data provides a representation of spoken words from the conversation, and one or more processors identify the spoken words to characterize the conversation near the focal point. That is, just the recognition of certain key words (e.g., cloud, processors, network) from a conversation characterizes the conversation (e.g., as being related to computers).

In one embodiment of the present invention a sensor from the one or more sensors is a microphone located near a particular cluster. The second set of received sensor data provides a representation of spoken words from the conversation, and one or more processors determine, out of a plurality of possibilities, a particular definition of one or more of the spoken words to characterize the conversation near the focal point. That is, rather than simply looking for key words used in the conversation, the (contextual) meaning of the words is used by the system to characterize the conversation.

In one embodiment of the present invention a sensor from the one or more sensors is a microphone located near a particular cluster. The second set of received sensor data provides a representation of spoken words from the conversation, and one or more processors evaluate the timbre, pitch and intensity of the spoken words to characterize the conversation near the focal point. For example, if the intensity of the spoken words is soft, then the conversation is characterized as being calm. On the other hand, if the intensity of the spoken words is loud, then the conversation is characterized as being harsh (assuming that the speakers are not merely trying to overcome ambient noise within the room). Similarly, if the conversation has hit a lull (indicating a roadblock in the conversation), then this information is also conveyed to the potential drop-in user, allowing that user to 1) avoid the conversation if he/she decides that it is not worthwhile, or 2) to join the conversation if he/she decides that he/she can get the conversation going again.

In one embodiment of the present invention a sensor from the one or more sensors is a camera. The second set of received sensor data describes an appearance of an entity (from the cluster) engaged in the conversation. One or more processors characterize the conversation based on the appearance of the entity engaged in the conversation. That is, if the camera can capture data used to identify persons within the cluster, to depict the movement (e.g., demonstrative motions) of persons within the cluster, etc.

In one embodiment of the present invention a sensor from the one or more sensors is a motion detector. The second set of received sensor data describes movement of an entity engaged in the conversation, and one or more processors characterize the conversation based on the movement of the entity engaged in the conversation. That is, based on how persons within the cluster are moving with relation to one another, where they are traveling, how demonstrative they are, etc. will characterize the cluster's conversation. For example, if the motion detector determines that the cluster is moving in an agitated manner, then the conversation is characterized as also being agitated. Similarly, if the cluster is moving as a group, then the conversation is characterized as being among a group of colleagues.

In one embodiment of the present invention, the conversation is between a first entity and a second entity within the cluster. Sensors from the one or more sensors are location detectors, such that the second set of received sensor data describes a relative position between the first entity and the second entity. One or more processors then characterize the conversation based on the relative position between the first entity and the second entity. For example, if two persons are close together and volume of the conversation is low, then the conversation is characterized as being hushed. This information is displayed on the GUI to advise potential drop-ins about the nature of the conversation. One or more persons in a cluster may indicate on the GUI (e.g., within characterization window 304a shown in FIG. 3) that the conversation of the cluster is public, private, or semi-private. Public conversations are open to fly-in participation. If a user tries to fly-in to a cluster conversation marked private, the user will not be able to because selection of the cluster will be prevented. For example, it may be indicated on the GUI that if the user tries to fly-in participate in a semi-private cluster, then they will generate a request to the people in the cluster, such that anyone in the cluster can approve their request, thus allowing the requester to fly in.

Other privacy schemes are possible, such as involving degrees of privacy, concerns of the group members for privacy, a maximum number of users for the group (e.g., there may be a desire to have at most 5 people in a particular cluster, which can be defined ahead of time or once a particular person comes into proximity of the cluster).

In one embodiment of the present invention, a sensor from the one or more sensors is a biometric sensor. The second set of received sensor data describes a biometric state of an entity (from the cluster) engaged in the conversation, and one or more processors characterize the conversation based on the biometric state of the entity engaged in the conversation. Thus, if the biometric sensors reveal that one or more members of a cluster are in a heightened state of arousal (i.e., anger), then the conversation is likewise characterized as being angry.

In one embodiment of the present invention, the electronic device used by the user to drop-in on the conversation is a remote communication device (e.g., user's computer 152 shown in FIG. 1) connected to a local communication device (e.g., computer 102 shown in FIG. 1) at the gathering place (e.g., location 201 in FIG. 2). One or more processors receive a request from a user of the remote communication device to join the conversation (e.g., by clicking one of the drop-in command buttons 306a-306c shown in FIG. 3). In response to receiving the request from the user of the remote communication device to join the conversation, one or more processors (e.g., in the local communication device, in the remote communication device, or in a third management computing device) connect the remote communication device to the local communication device to enable the user to join the conversation.

While the drop-in by the user may be prompted by a request from the user of the remote electronic device, the drop-in may be prompted by an invitation extended by the local communication device that is proximate to the cluster having the conversation.

In another embodiment, the drop-in is automatically initiated by the system. That is, by evaluating a profile of a remote user, and comparing that profile with the character and content of the conversation, an audio-visual connection can be automatically established between the cluster and the user's computer, showing the user the cluster and allowing him/her to join in the conversation.

While the present invention has been described as providing a user with means for remotely participating in a conversation, one embodiment the present invention enables a local user to join in a conversation through the use of local video screens. That is, rather than presenting the characterization windows 304a-304c on a GUI 310 that is remote from the clusters, the GUI 310 may be on a computer that is in the same room as the clusters 203a-203c shown in FIGS. 2-3. Thus, the user can simply walk over to the desired cluster and drop-in on the conversation, now knowing what the cluster is discussing in real-time, who is in the cluster, etc. Alternatively, the information shown in the characterization windows 304a-304c in FIG. 3 can be displayed on overhead displays above the clusters 203a-203c, such that persons within the room can look at the overhead displays and walk to the cluster of interest to them based on what is being displayed in real-time on the overhead displays.

The present invention may be implemented using cloud computing, as now described. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
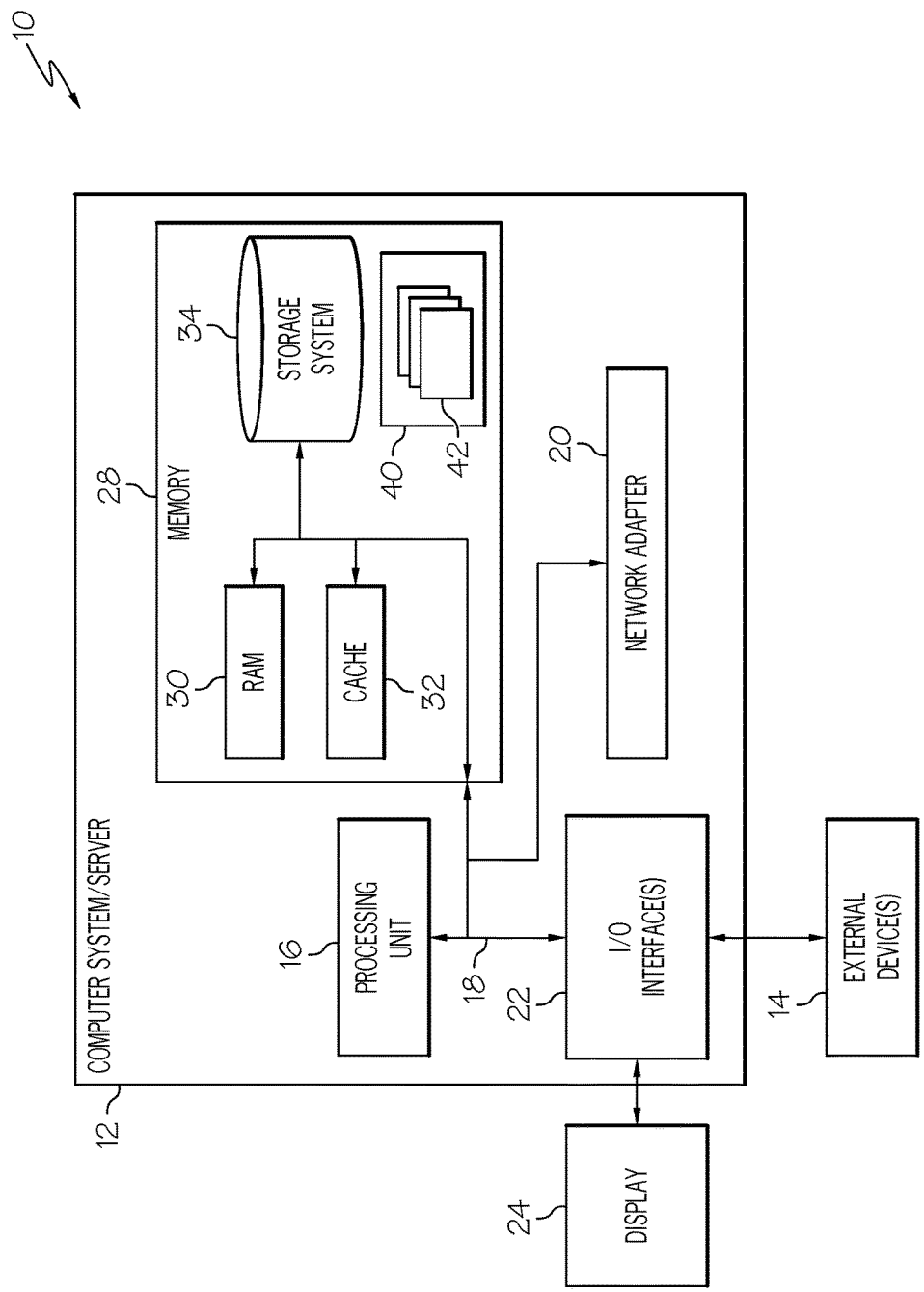
FIG. 5 depicts a cloud computing node according to an embodiment of the present disclosure.

Referring now to FIG. 5, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 6:
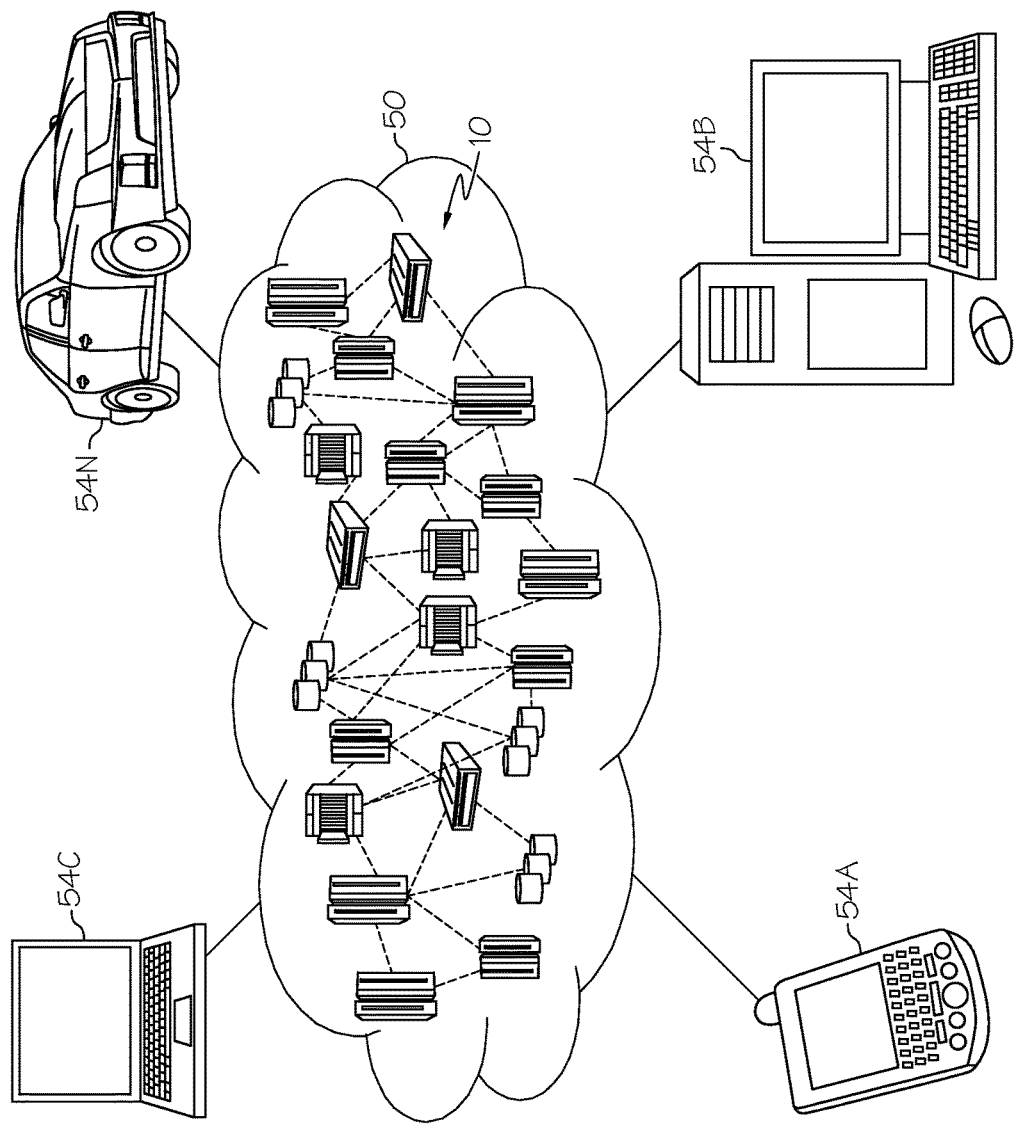
FIG. 6 depicts a cloud computing environment according to an embodiment of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone MA, desktop computer MB, laptop computer MC, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
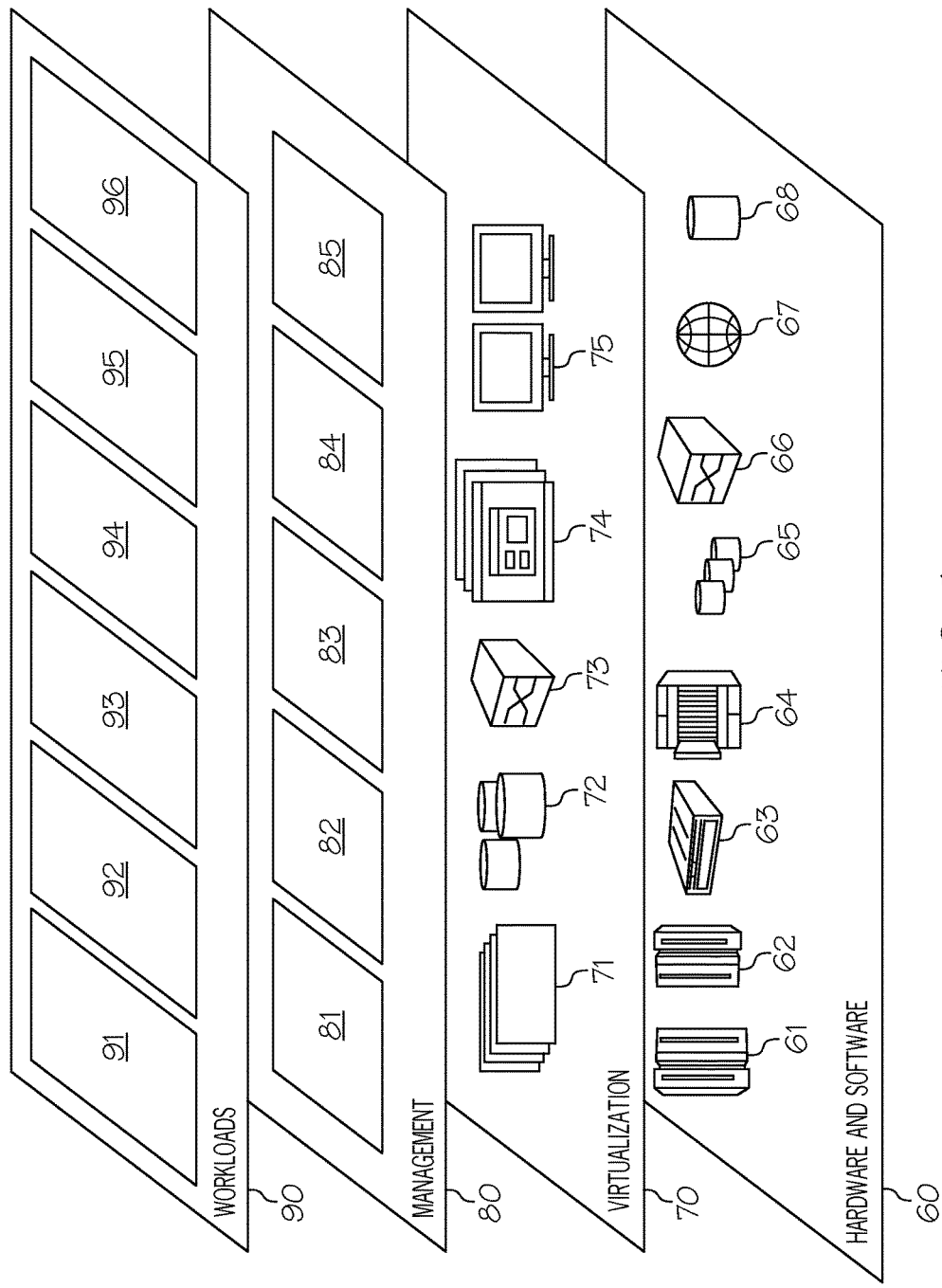
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cluster identifying and characterizing processing 96 (for identifying and characterizing clusters of persons to enable an electronic device to allow a user to drop-in on the identified and characterized cluster of persons).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method of managing drop-ins on conversations near a focal point of proximal activity in a gathering place, the computer-implemented method comprising:
receiving, by one or more processors, a first set of sensor data about persons from one or more sensors in a gathering place of the persons;
identifying, by one or more processors, a focal point of proximal activity based on the first set of received sensor data received from the one or more sensors, wherein the proximal activity is by a particular cluster of persons from multiple clusters of persons within a same physical location, and wherein the particular cluster of persons is identified as having persons who are each within a predetermined distance from one another;
characterizing, by one or more processors, a conversation near the focal point based on a second set of received sensor data from the one or more sensors, wherein the second set of received sensor data is of a speech of the persons;
presenting, by one or more processors, a characterization of the conversation to an electronic device;
enabling, by one or more processors, the electronic device to allow a user to electronically and remotely drop-in on the conversation by establishing a communication link between a local communication device at the focal point and the electronic device at a remote location, wherein the electronic device is a remote communication device connected to the local communication device at the gathering place of the persons;
receiving, by one or more processors, a request from the user of the remote communication device to join the conversation; and
in response to receiving the request from the user of the remote communication device to join the conversation, selectively connecting, by one or more processors, the local communication device to the remote communication device based on a content of the conversation being held by members of the particular cluster of persons.

2. The computer-implemented method of claim 1, wherein a sensor from the one or more sensors is a microphone, wherein the second set of received sensor data provides a representation of spoken words from the conversation, and wherein the computer-implemented method further comprises:
identifying, by one or more processors, the spoken words to characterize the conversation near the focal point.

3. The computer-implemented method of claim 1, wherein a sensor from the one or more sensors is a microphone, wherein the second set of received sensor data provides a representation of spoken words from the conversation, and wherein the computer-implemented method further comprises:
evaluating, by one or more processors, a definition of one or more of the spoken words to characterize the conversation near the focal point.

4. The computer-implemented method of claim 1, wherein a sensor from the one or more sensors is a microphone, wherein the second set of received sensor data provides a representation of spoken words from the conversation, and wherein the computer-implemented method further comprises:
evaluating, by one or more processors, one or more of a timbre, pitch, and intensity of the spoken words to characterize the conversation near the focal point.

5. The computer-implemented method of claim 1, wherein a sensor from the one or more sensors is a camera, wherein the second set of received sensor data further describes an appearance of an entity engaged in the conversation, and wherein the computer-implemented method further comprises:
characterizing, by one or more processors, the conversation based on the appearance of the entity engaged in the conversation.

6. The computer-implemented method of claim 1, wherein a sensor from the one or more sensors is a motion detector, wherein the second set of received sensor data further describes movement of an entity engaged in the conversation, and wherein the computer-implemented method further comprises:
characterizing, by one or more processors, the conversation based on the movement of the entity engaged in the conversation.

7. The computer-implemented method of claim 1, wherein the conversation is between a first entity and a second entity, wherein sensors from the one or more sensors are location detectors, wherein the first entity and the second entity are both within the particular cluster of persons, wherein the second set of received sensor data further describes a relative position between the first entity and the second entity, and wherein the computer-implemented method further comprises:
characterizing, by one or more processors, the conversation based on the relative position between the first entity and the second entity.

8. The computer-implemented method of claim 1, wherein a sensor from the one or more sensors is a biometric sensor, wherein the second set of received sensor data further describes a biometric state of an entity engaged in the conversation, and wherein the computer-implemented method further comprises:
characterizing, by one or more processors, the conversation based on the biometric state of the entity engaged in the conversation.

9. The computer-implemented method of claim 1, wherein the local communication device is a local display at the focal point of proximal activity, and wherein the computer-implemented method further comprises:
displaying, by one or more processors, the characterization of the conversation on the local display.

10. The computer-implemented method of claim 1, further comprising:
receiving, by the remote communication device, a chemical sensor reading from a chemical sensor at the focal point, wherein the chemical sensor reading identifies a chemical that is emanating from members of the particular cluster of persons;
in response to receiving, by the remote communication device, the chemical sensor reading from the chemical sensor at the focal point, determining, by one or more processors, that members of the particular cluster of persons work in a specific location in which the chemical is produced; and
in response to determining that the particular cluster of persons work in the specific location in which the chemical is produced, further enabling, by one or more processors, the remote communication device to allow the user to electronically and remotely drop-in on the conversation by establishing the communication link between the local communication device at the focal point and the remote communication device.

11. The computer-implemented method of claim 1, wherein the one or more sensors are biometric sensors that detect flushed skin, rapid breathing, and dilated pupils on one or more members of the particular cluster of persons, and wherein the computer-implemented method further comprises:
determining, by one or more processors and based on biometric sensor readings from the biometric sensors, that a group dynamic of the particular cluster of persons is of high intensity; and
in response to determining, based on biometric sensor readings from the biometric sensors, that the group dynamic of the particular cluster of persons is of high intensity, enabling, by one or more processors, the remote communication device to allow the user to electronically and remotely drop-in on the conversation by establishing the communication link between the local communication device at the focal point and the remote communication device.

12. The computer-implemented method of claim 1, further comprising:
transmitting, from the remote communication device to a mobile robotic device at the focal point, instructions that cause the mobile robotic device to adjust a position of the mobile robotic device within the particular cluster of persons and that cause a content on a screen mounted on the mobile robotic device to be modified.

13. A system for managing drop-ins on conversations near a focal point of proximal activity in a gathering place, the system comprising:
one or more sensors in a gathering place, wherein the one or more sensors generate a first set of sensor data and a second set of sensor data about persons, wherein the first set of sensor data identifies a focal point of proximal activity in the gathering place, wherein the proximal activity is by a particular cluster of persons from multiple clusters of persons within a same physical location, wherein the particular cluster of persons is identified as having persons who are each within a predetermined distance from one another, and wherein the second set of sensor data characterizes speech by the persons during a conversation near the focal point; and
a connection to an electronic device, wherein the connection transmits a characterization of the conversation to the electronic device, and wherein the connection enables the electronic device to allow a user to electronically and remotely drop-in on the conversation by establishing a communication link between a local communication device at the focal point and the electronic device at a remote location, wherein the electronic device is a remote communication device, and wherein the communication link is established by:
receiving, by one or more processors, a request from the user of the remote communication device to join the conversation; and
in response to receiving the request from the user of the remote communication device to join the conversation, selectively connecting the local communication device to the remote communication device based on a content of the conversation being held by members of the particular cluster of persons.

14. The system of claim 13, wherein a sensor from the one or more sensors is a microphone, wherein the second set of sensor data provides a representation of spoken words from the conversation, and wherein the spoken words characterize the conversation near the focal point.

15. The system of claim 13, wherein a sensor from the one or more sensors is a camera, wherein the second set of sensor data further describes an appearance of an entity engaged in the conversation, and wherein the entity engaged in the conversation characterizes the conversation.

16. The system of claim 13, wherein the conversation is between a first entity and a second entity, wherein sensors from the one or more sensors are location detectors, wherein the second set of sensor data further describes a relative position between the first entity and the second entity, and wherein the relative position between the first entity and the second entity characterizes the conversation.

17. A computer program product for managing drop-ins on conversations near a focal point of proximal activity in a gathering place, the computer program product comprising a non-transitory computer readable storage medium having program code embodied therewith, the program code being readable and executable by a processor to perform a method comprising:

receiving a first set of sensor data about persons from one or more sensors in a gathering place of the persons;

identifying a focal point of proximal activity based on the first set of received sensor data received from the one or more sensors, wherein the proximal activity is by a particular cluster of persons from multiple clusters of persons within a same physical location, and wherein the particular cluster of persons is identified as having persons who are each within a predetermined distance from one another;

characterizing a conversation near the focal point based on a second set of received sensor data from the one or more sensors, wherein the second set of received sensor data is of a speech of the persons;

presenting a characterization of the conversation to an electronic device;

enabling the electronic device to allow a user to electronically and remotely drop-in on the conversation by establishing a communication link between a local communication device at the focal point and the electronic device at a remote location, wherein the electronic device is a remote communication device connected to the local communication device at the gathering place of the persons;

receiving, by one or more processors, a request from the user of the remote communication device to join the conversation; and in response to receiving the request from the user of the remote communication device to join the conversation, selectively connecting, by one or more processors, the local communication device to the remote communication device based on a content of the conversation being held by members of the particular cluster of persons.

* * * * *